(12) United States Patent
Hepper et al.

(10) Patent No.: US 7,801,895 B2
(45) Date of Patent: Sep. 21, 2010

(54) METHOD AND APPARATUS FOR ORGANIZING NODES IN A NETWORK

(75) Inventors: Dietmar Hepper, Hannover (DE); Hui Li, Hannover (DE); Meinolf Blawat, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 719 days.

(21) Appl. No.: 11/605,162

(22) Filed: Nov. 28, 2006

(65) Prior Publication Data

US 2007/0136384 A1 Jun. 14, 2007

(30) Foreign Application Priority Data

Dec. 13, 2005 (EP) .................................. 05112058

(51) Int. Cl.
*G06F 17/30* (2006.01)
(52) U.S. Cl. ....................................... 707/737; 707/812
(58) Field of Classification Search ................. 707/609, 707/736–738
See application file for complete search history.

(56) References Cited

U.S. PATENT DOCUMENTS

| | | | |
|---|---|---|---|
| 6,745,311 B2 * | 6/2004 | Fabrizio et al. ............. 711/172 |
| 7,539,706 B1 * | 5/2009 | Campbell .......................... 1/1 |
| 2002/0174306 A1 | 11/2002 | Gajjar et al. |
| 2003/0046270 A1 * | 3/2003 | Leung et al. .................... 707/1 |
| 2003/0098894 A1 * | 5/2003 | Sheldon et al. ............. 345/853 |
| 2003/0225801 A1 | 12/2003 | Devarakonda et al. |
| 2003/0233446 A1 * | 12/2003 | Earl ........................... 709/224 |
| 2005/0203907 A1 * | 9/2005 | Deshmukh et al. ............ 707/10 |

OTHER PUBLICATIONS

Mandis Beigi, et al., "Policy-Based Information Lifecycle Management in a Large-Scale File System", olicies for Distributed Systems and Networks, 2005, Sixth IEEE International Workshop on Stockholm, Sweden Jun. 6-8, 2005, Piscataway, NJ. USA, IEEE. European Search Report.

* cited by examiner

*Primary Examiner*—John R. Cottingham
*Assistant Examiner*—James E Richardson
(74) *Attorney, Agent, or Firm*—Robert D. Shedd; Harvey D. Fried; James McKenzie (57) ABSTRACT

In current Distributed Storage Systems, applications may determine the device on which data shall be stored. The invention provides a method for automatically selecting an individual storage device within a DSS. A method for automatically classifying a node in a network comprises determining data classes, automatically classifying data of said data classes stored on a node, determining the amount of stored data per data class, calculating data dominance values for each of the data classes, receiving a request that indicates a data type according to one of said data classes, and providing said dominance value according to the requested data class.

Further, a method for automatically organizing nodes in a network comprises receiving a request for storing data of a particular data type, transmitting the request to storage nodes, receiving from the storage nodes respective dominance values, and selecting the node with the highest dominance value for storing the data.

7 Claims, 8 Drawing Sheets

Monolithic Block API for Chaotic Stock Keeping

Fig. 5

Monolithic Storage System

METHOD AND APPARATUS FOR ORGANIZING NODES IN A NETWORK

This application claims the benefit, under 35 U.S.C. §119 of European Patent Application 05112058.2, filed Dec. 13, 2005

FIELD OF THE INVENTION

This invention relates to a method and an apparatus for organizing nodes in a network, wherein the nodes are also classified according to preferred data types.

BACKGROUND

A Storage Area Network (SAN) is known to be a network of storage disks, connecting multiple servers to a centralized disk storage pool. By treating all connected storage as a single resource, system maintenance is easier. A SAN can be centralized or distributed. A centralized SAN connects multiple servers to a collection of disks, whereas a distributed SAN typically uses one or more switches to connect nodes within buildings. Both types however use a centralized control structure, i.e. a client-server structure.

In a general Distributed Storage System (DSS), applications may determine the device on which data shall be stored. This is called "demanded storage target" herein. Often the user is requested to select a particular storage device. Intelligent ways of automatically selecting an individual storage device within a DSS are lacking.

Independent from DSS, storage devices may be duplicated for improved data security, availability or accessibility. The concept of cutting data into partitions and storing the partitions on different storage devices can also be applied within the single nodes of a DSS.

SUMMARY OF THE INVENTION

It would be desirable that more intelligent storage devices can be used, which act as autonomous components and allow the creation of Distributed Storage Systems without central storage controller.

Further, it would be desirable that the whole Distributed Storage System behaves like a "monolithic storage block", i.e. it appears to applications and users as one (big) coherent storage facility, while internally it maintains a structure with individual devices. This is a different, orthogonal kind of behaviour of the DSS than conventional storage clusters, because each storage device remains an individual device with individual tasks within the DSS, while from outside the DSS can be addressed as a unit when storing data; it is not necessary to address individual devices within the DSS from without. As a consequence, storage devices may freely be connected to or disconnected from the DSS, wherein they may bring or take usable data, e.g. audio-visual (AV) data like a movie. Preferably, the devices within a DSS are not in a client-server structure, but can act as both, client and server, like e.g. in a peer-to-peer (P2P) network.

Further, in a DSS network, which is structured according to the invention and behaves like a monolithic storage block, dominant data types associated with storage devices are determined. This information is used for selecting a storage device when data of a particular data type are to be stored. The information can also be used when data of a particular data type are searched: in this case it is possible to search preferably/first on storage devices that have a high amount of data of the specified type stored.

The present invention provides a method for automatic classification of a node in a network, comprising the steps of
determining at least one data class, e.g. video, audio or text,
automatically classifying data stored on a node according to said data class,
determining the amount of data classified according to said data class, wherein the number of files and the average size of said files is determined,
calculating from the determined amount of data classified into said data class a data type dominance value being a measure for the relative dominance of data stored on the node according to said data class,
receiving a request that indicates a data type according to said data class, and
providing, in response to the request, said dominance value being a measure for the relative dominance of data according to said data class.

Further according to the invention, a method for automatically organizing nodes in a network comprises the steps of
receiving a request for storing data, the request indicating a data type according to a predefined data class,
transmitting the request to a plurality of storage nodes,
receiving from the storage nodes respective dominance values being a measure for the relative dominance of data stored on the respective node according to said data class,
comparing the dominance values of the responding nodes, and
selecting the node with the highest dominance value for storing the data.

The method according to the invention can be further specified in that the amount of data is classified in terms of a combination of file sizes and number of files.

The method according to the invention can be further specified in that the dominance value of a node relating to a data type is calculated according to $$E_{dominant,type} = RPSC * A_{total} * k_1$$

with $$A_{total} = N_{total} * S_{total}$$

$$RPSC = k_2 - k_3(k_4 + S_{average} + C_{used})/C_{total}$$

wherein $k_1$, $k_2$, $k_3$, $k_4$ are constants, $N_{total}$ is the total number of data files of said data type, $S_{total}$ is the accumulated size of files of the data type, $S_{average}$ is the average size of files of the data type, $C_{used}$ is occupied storage capacity of the node and $C_{total}$ is the total storage capacity of the node.

In one embodiment, the classifying and/or determining of a data class is done according to metadata associated to the data. In another embodiment however, the classifying and/or determining of a data class is done according to other indications, e.g. file extension, or file header analysis.

In one embodiment, the nodes are peers in a peer-to-peer network.

In one embodiment of the invention, the selection of a node is based on a relative free storage capacity (RFSC) of the node, which is calculated according to $$RFSC = c_1 - c_2(c_3 + S_{in\_data} + C_{used})/C_{total}$$

with $c_1$, $c_2$, $c_3$ being constants, $S_{in\_data}$ being the size of data to be stored, $C_{used}$ being occupied storage capacity of the node and $C_{total}$ being total storage capacity of the node.

A network protocol command according to the invention is suitable for requesting or providing a dominance value ($E_{dominant,type}$), wherein the requested or provided dominance value relates to a data type and a network node and the command contains an indication of the data type. The dominance value of a particular node is calculated according to $$E_{dominant,type} = RPSC * A_{total} * k_1$$

with $$A_{total} = N_{total} * S_{total}$$

$$RPSC = k_2 - k_3(k_4 + S_{average} + C_{used})/C_{total}$$

wherein $k_1$, $k_2$, $k_3$, $k_4$ are constants, $N_{total}$ is the total number of data files of said data type stored on the node, $S_{total}$ is the accumulated size of files of the data type stored on the node, $S_{average}$ is the average size of files of the data type stored on the node, $C_{used}$ is the total occupied storage capacity of the node and $C_{total}$ is the total storage capacity of the node. In a simple case, the constants are $k_1 = k_2 = k_3 = 1$ and $k_4 = 0$.

A corresponding apparatus for automatic classification of a node in a network comprises means for determining at least one data class (e.g. video, audio, text), means for automatically classifying data stored on a node according to said data class, means for determining the amount of data classified according to said data class, wherein the number of files and the average size of said files is determined, means for calculating from the determined amount of data classified into said data class a dominance value being a measure for the relative dominance of data stored on the node according to said data class, means for receiving a request that indicates a data type according to said data class, and means for providing, in response to the request, said dominance value being a measure for the relative dominance of data according to said data class.

Further, an apparatus for automatically organizing nodes in a network according to the invention comprises means for receiving a request for storing data, the request indicating a data type according to a predefined data class, means for transmitting the request to a plurality of storage nodes, means for receiving from the storage nodes respective dominance values being a measure for the relative dominance of data stored on the respective node according to said data class, means for comparing the dominance values of the responding nodes, and means for selecting the node with the highest dominance value for storing the data.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 how applications see the Distributed Storage System.

DETAILED DESCRIPTION OF THE INVENTION

When a Distributed Storage System (DSS) is built out of individual storage devices, two different, orthogonal kinds of behaviour of a DSS can be chosen: Either an application selects the device on which the data shall be stored (demanded storage target), or the whole DSS appears as one big coherent storage facility and behaves like a unit. This is called "monolithic storage block" herein.

If an application intends to select a certain storage device to store data, the nodes in the DSS first inform the application about their status and capabilities, so that the application can decide where to store the data. On the other hand the user may be interested in a convenient automatic "storekeeping", since he has no further interest in where the content is stored. In this case, it is advantageous if the DSS behaves like a monolithic storage block.

If in the demanded storage target concept an explicit node is demanded as a target to store data, the nodes in the DSS deliver appropriate information about their resources. In this case, the application has to decide in an appropriate manner, whereas the nodes in the DSS have to deliver suitable system status and capability data.

If in the monolithic block concept no explicit node is demanded as a target to store data, the DSS is accessible like a unit. The application sees the DSS as a monolithic block of storage capacity. The DSS itself looks autonomously for a storage device with a matching free storage capacity and sufficient transfer rate. This is realised based on a set of rules that are implemented on and obeyed by each (storage) node in the network.

Figure 1:
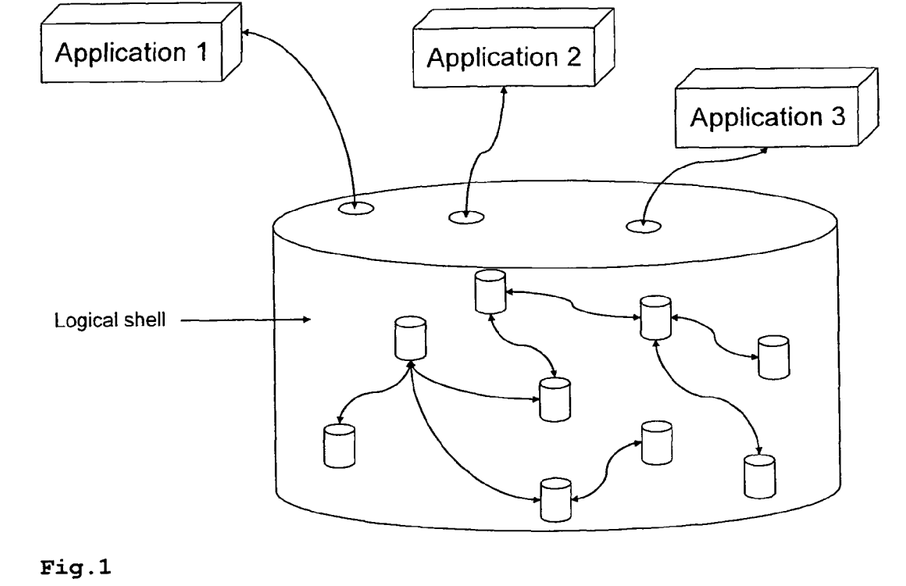

Applications access the DSS via the node's Intermediate Control Layer (ICL). The ICL houses the modes that may be used by the applications and provides the corresponding application interface. The ICL forms through their interaction the logical shell of the DSS. FIG. 1 illustrates how applications see the DSS. The modes are in fact well-defined procedures of Control Message sequences. In the following, the different modes will be introduced starting with the description of the so called "Demanded Storage Target" mode, which allows to directly access selected nodes. Then the "File Splitting" functionality will be explained, which for instance allows carrying on a recording, if the capacity of the recording device is running out.

Since the complexity of networks steeply increases with the increasing number of nodes and edges, keeping the overview of such steadily growing complexity is an unreasonable or even impossible task. In order to constitute a real added value to consumers, the storage network should organise itself. "Monolithic Storage Behaviour" is outlined below, which allows applications to access the storage network as a single coherent storage block. The "Monolithic Storage Behaviour" is the most complex system mode, but offers also the most convenience to the user, since in this mode the system operates as far as possible in a self-administrating manner. In this mode, applications "see" the storage network as one coherent storage block. Two extreme solutions can be considered: The system behaves as a 'chaotic', or as a 'well-sorted/self-sorting' system. In the first case, all content will be stored wherever it is possible, whereas in the second case the content will be sorted and stored according to rules, as exemplarily defined below. The invention refers to aspects of both functionalities, following the principle of simplicity.

Figure 2:
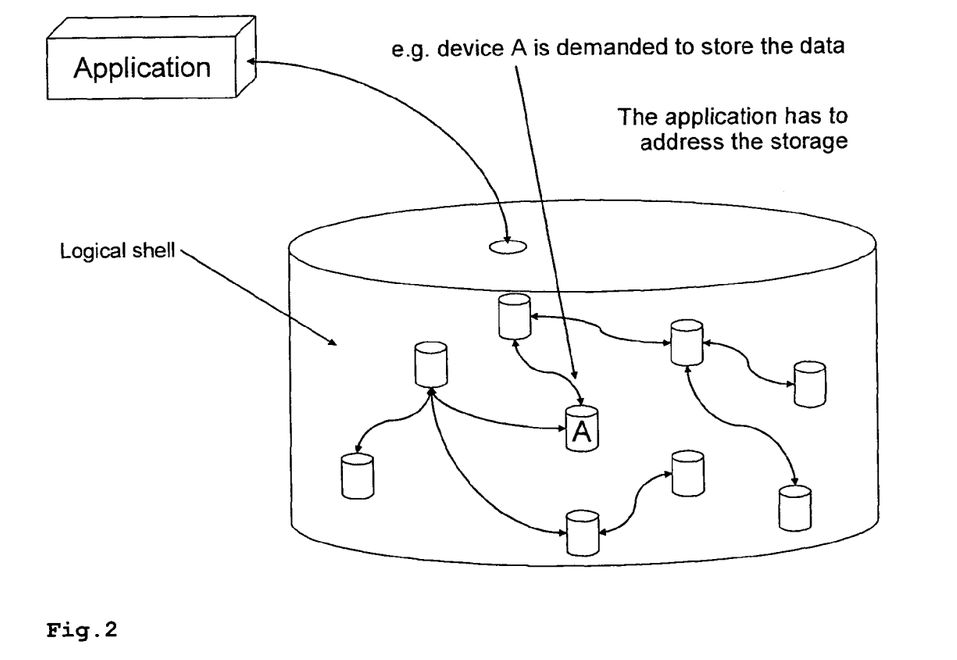
FIG. 2 the "Demanded Target Storage" mode.

The "Demanded Storage Target" mode is a straight-forward approach and mentioned here just for completeness. If the user wants the DSS to store data on a specific storage device, means are available to directly address the desired storage devices. This mode is illustrated in FIG. 2, where an application (or the user) decides to store data on a particular device A. This very basic mode requires the user to perform the storage network administration, and is therefore annoying.

In the following, a Monolithic Block application is explained.

It is assumed that in the DSS there is no centralised server for managing storage devices. Each storage device works server-independent. Devices communicate via messages, usually requests and answers, like e.g. in a peer-to-peer network. By exchanging control messages, non-centralised network devices can communicate with each other and organise themselves. The concept of a "Monolithic Block" refers to a group of storage nodes that form a logical group, wherein the storage capacity of the DSS is regarded as a whole from the outside, and individual nodes are not distinguished from the outside. Instead, storage is managed according to fixed rules that are followed by each storage device. Such rules are exemplarily defined below. They can be implemented in software (as an intermediate layer) within the DSS in such a way that the group of storage nodes behaves like a unit, i.e. a monolithic block.

The present invention describes how this can be done, and how the co-operation between the DSS and an application that requests storage and retrieval can be done. Further, the present invention describes how to handle storage requests coming from outside the monolithic block and storage requests coming from one of the nodes within the monolithic block, and which messages and control metadata can be used to realise the concept.

According to the invention, the layers shown in Tab. 1 can be distinguished.

TABLE 1

Overview of layers

Application Layer (AL)
"Monolithic Block" Layer (MBL)
Control Language Layer (CLL)
Peer-to-Peer Technology Layer (PPL)
Network, Transport, Link and Physical Layers Storage requests are initiated from the Application Layer (AL). They are performed on the Control Language Layer (CLL), using Control Messages. The Monolithic Block Layer (MBL) forms the link between them, thus implementing the monolithic block concept by managing the communication between the nodes and by properly using Control Metadata. Interfaces are assumed to exist between the layers as appropriate, e.g. an AL-MBL interface and a CLL-PPL interface. The messages and control metadata are associated with the peer-to-peer technology layer (PPL).

The MBL provides users the virtual effect that all the participating storage devices appear as a single storage block. Based on a predefined default matching strategy, the MBL can save incoming data to appropriate storage devices automatically.

Exemplarily, in one embodiment of the invention all storage devices connected to a network form a Monolithic Block (MB), and the storage requests come from one of the nodes in the network. The network may be eg. a home network implemented as an OwnerZone, as described in the European patent application EP1427149. In this case, an application running on one of the nodes in the network or OwnerZone may request to record a piece of content on the MB, i.e. somewhere within the OwnerZone, including the requesting node itself, without the application knowing where the content will be stored.

When looking from outside at the home network, the question arises whether it is permitted to store a piece of content in the DSS within the home network. This question is e.g. necessary to solve when accessing the home from a remote place via a portable or mobile device. If the remote device or node can be identified as authorized, eg. as part of the home network at least for the time of accessing it, it is within the home network and will get access to the network nodes, and thus the DSS.

In the following, the strategy of a MB application is outlined.

The general tasks for the MB application are data storage and data retrieval, i.e. saving incoming data in the monolithic storage block and retrieving saved data from the monolithic storage block. The data storage function of the MB application needs more sophisticated algorithms than the data retrieval.

While saving incoming data to the MB system, an ideal case may be to save the data in a well-sorted manner directly on a certain destination storage device. This is called "sorted storage" here accordingly. But sometimes a user may desire just to store data in a more "chaotic stock keeping" manner; at an appropriate point in time or after user arrangement, the temporary storage data will be further sorted to a better destination device.

The chaotic stock keeping and well-sorted storage are two exemplarily predefined monolithic storage strategies. Both strategies can be realised through system-defined storage device matching criteria.

The searching for devices is for "chaotic" stock keeping simpler and quicker than for well-sorted storage. "Chaotic" stock keeping means that the data in the MB are not sorted by any criterion, such as a logical matching criterion. Only some basic physical properties (e.g. storage capacity, transfer rate) of storage devices are considered. Thus, chaotic storage is also determined in some way, but less structured than in the well-sorted case. However, the term "chaotic" is used here for simplicity. For chaotic stock keeping, a storage device can be selected if it can satisfy physical matching criteria of the MB application.

When searching for a device for well-sorted storage, the system analyses the stored data, e.g. through metadata (MD) accompanying the data. Depending on the result of the analysis, the monolithic behaviour may switch e.g. to a "Sorted Storage Behaviour driven by Metadata", which means that different content categories as defined in the MD are stored on separate devices, e.g. all sport events will be stored on drive A, movies on drive B etc. As appropriate, the system can then relocate the stored content according to its new system behaviour. During the working phase, from time to time (e.g. depending on data storage/retrieval statistics) the system analyses the stored content in order to decide whether the performed behaviour fits well or not.

In case of a maladjusted behaviour characteristic, the system may change its mode of operation and select a better suited one.

Well-sorted storage means that the data in the MB are sorted by both physical and logical matching criteria. E.g. storage devices are associated with certain genres, or video data may be saved together in devices preferred for video, MP3 may be saved in audio collection devices, etc.

A strategy can be selected by default or by an application, or on behalf of or by the user. The latter could happen if the user wishes to associate a certain node or nodes (whether equipped with a stationary or a removable medium) with certain subjects the user is interested in. The nodes that are not pre-assigned may then be treated according to the default or another rule selected by the application on behalf of the user.

The two strategies can be mutually converted according to system requirements. The chaotic stock keeping state of a MB system can be converted into the well-sorted storage state through maintenance processing. The well-sorted storage state can be turned into a chaotic stock keeping state by giving up its logical matching process and specific physical matching process.

For both chaotic stock keeping and well-sorted storage, the device search process is the core task of the MB system. In order to find the appropriate destination device, physical and logical parameters of both incoming data and storage devices are evaluated. For chaotic stock keeping, only simplified physical matching criteria are needed. For well-sorted storage, both physical and logical matching processes are run.

Figure 4:
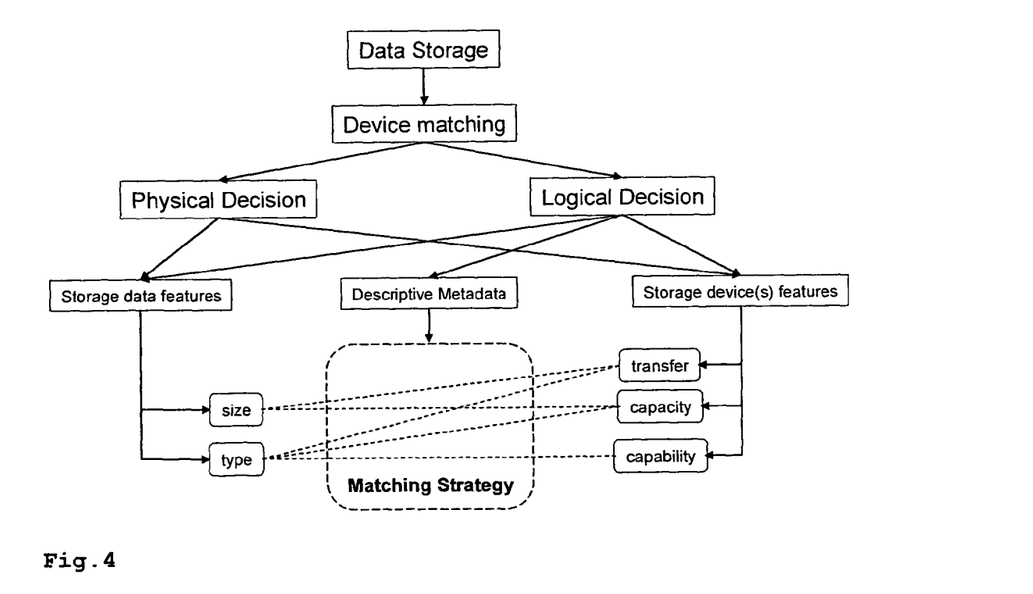
FIG. 4 Identifying an appropriate storage device ("device matching") as the core task of the Monolithic Block System.

In the following, the procedure of evaluating appropriate storage devices for incoming data, as depicted in FIG. 4, is called "Device Matching". Generally, the device matching process includes physical decision and logical decision. For physical decision, physical parameters of incoming data and storage devices are considered. For logical decision, MD features of incoming data, storage devices and from other MD sources are considered for device searching.

In applying the physical decision, the following physical parameters are evaluated: free storage capacity of a node, free transfer rate of a node, and preferred data type of a node. Here, all these parameters are treated as physical parameters.

In a logical decision, descriptive metadata are evaluated. Assigned descriptive MD categories for the monolithic storage system are predefined, and can eg. be included in a parameter template used on the AL, as described in detail below.

The realisation of all this is possible by means of a Control Language. It is assumed that the MBL software is the same on every participating node, ie. every node in the (logical) network, e.g. OwnerZone. The MBL software on the node where the application launches an action manages the related process. I.e. the MB concept is realised by a set of rules implemented in each node's MBL software, and is in general applied by the node launching an action.

Monolithic Storage System Storage Preferences

The monolithic storage system works under control of system preferences and user preferences, both for chaotic stock keeping and well-sorted storage.

According to system preferences, the behaviour of the system is pre-defined, e.g. when manufactured or purchased, and the system may run automatically based on default parameter settings. During the lifetime of a particular system configuration, only one system preference may be applied to rule the behaviour of the whole system, either chaotic stock-keeping or well-sorted storage. The system preferences may be superseded by user preferences.

If there are any user preferences regarding the monolithic behaviour of the system, they supersede the automatic settings whenever possible. The user's preferences of the characteristic behaviour of the system may be manually entered at the AL.

Monolithic Block Application Set-Up

Figure 5:
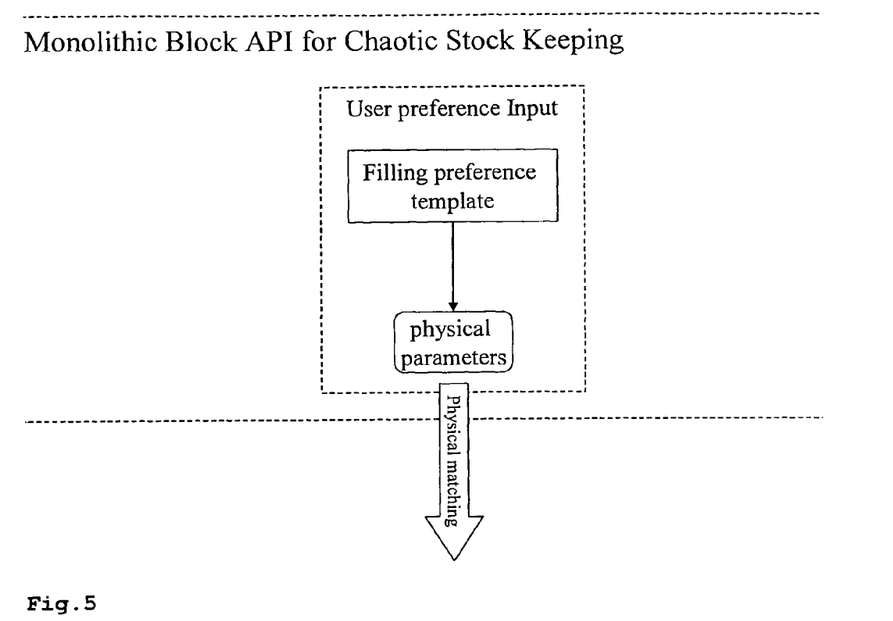
FIG. 5 Monolithic block API for chaotic stock keeping.

For chaotic stock keeping, the system set-up of the MB application is done on the AL. As shown in FIG. 5, the system set-up consists of the user preferences input.

For well-sorted storage, the system set-up of the MB application is also done on the AL. The system set-up now includes user preference input, device definition and system maintenance. The system set-up procedure provides a user API to the monolithic block system. The initial system state will be defined during the system set-up phase. According to system feedback, regular system maintenance may be run in order to obtain a longer lifetime of the MB application.

User Preference Input

User preference input occurs both in chaotic stock keeping and in well-sorted storage. During user preference input, a parameter control template is presented to the user and filled in according to his input. Template categories have been predefined according to the current MB system rules. With the help of parameter categories of the template, users may enter their preferred physical parameters, or logical parameters (for well-sorted storage), such as storage location, device properties, type of media data and descriptive MD, in order to control the device matching procedure according to their own interests. If no user-preferred parameter is given or considered, the template may use a group of default physical or logical parameters for system usage. Parameters in the template are used by the systems physical and logical matching processes.

For chaotic stock keeping, only a simplified parameter control template is used to input physical parameters. For well-sorted storage, a full parameter control template is used, which contains both physical and logical parameters.

During user preference input for the well-sorted storage strategy, the user may also determine the control device initialisation procedure. The user may define or change the device label category, and the user may also label empty devices.

Device Initialisation

The device initialisation function exists only in the well-sorted storage strategy. During system initialisation, all device properties of current distributed devices will be collected; and all devices will be labelled by device preference MD, such as data type and other descriptive metadata. For empty devices a device preference label will be defined directly by the user according to current device property. For occupied devices, the device preference will be calculated by the MB system.

For automatic system storage matching, the storage devices preferred data will be labelled during the system initialisation phase. All categories of labels that can be used for the current system should be predefined. Usually they are descriptive MD, which describe device-preferred sort of data, such as data format, genre, content title, etc. For different MB systems, different sorts of label categories can be designed. During the initialisation phase, each monolithic block system may choose one sort of label category for its application.

In one embodiment, all current storage devices in the system are labelled according to at least one label category. For empty storage devices, the user may analyse the devices' storage capacity, transfer rate and other characteristics, and then label the device with a label defined in the label category. For multimedia system applications, an important label category is "data type", which is therefore used as default. E.g. data will be sorted in storage devices according to their data type, such as video, audio, text, which may be further subdivided into DVD (movies), MP3 (audio), XML (general), DOC (text) etc.

For occupied devices, i.e. devices that contain stored data, their dominant data type is calculated. Occupied devices are labelled with their dominant data type. This will be discussed in detail below.

The device initialisation phase creates an initial state of the MB system. Later, during the system application, the system state may be changed and operated through system maintenance processing.

System Maintenance

DSS maintenance is used in the well-sorted storage strategy to keep the MB system operational. There are two kinds of system maintenance: active and passive. The active maintenance is run regularly according to some predefined period or system status. The passive maintenance will be activated by a request of the MB system, when any system limit is reached.

Figure 6:
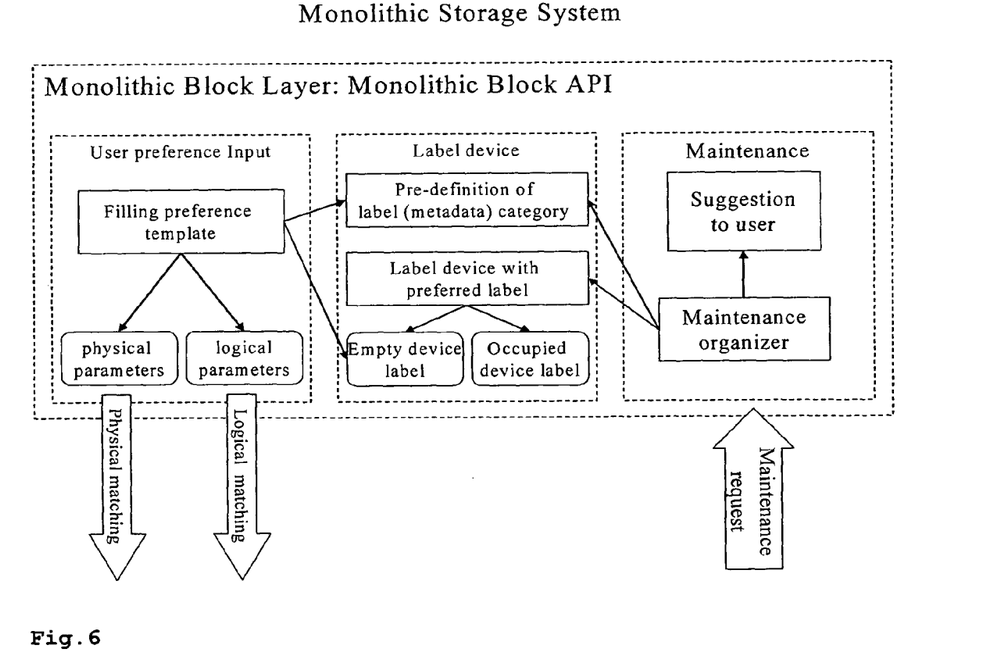
FIG. 6 Monolithic block set-up for well-sorted storage.

When the maintenance block receives the maintenance request, as shown in FIG. 6, a maintenance organiser will automatically analyse all storage devices and assign new device labels to storage devices. After analysing the devices, the maintenance organiser may also generate maintenance suggestions to users, so that users may improve the system "manually", e.g. by deleting old data, sorting data, or purchasing new storage disks.

Dominant Data Type in Occupied Storage Devices

Figure 7:
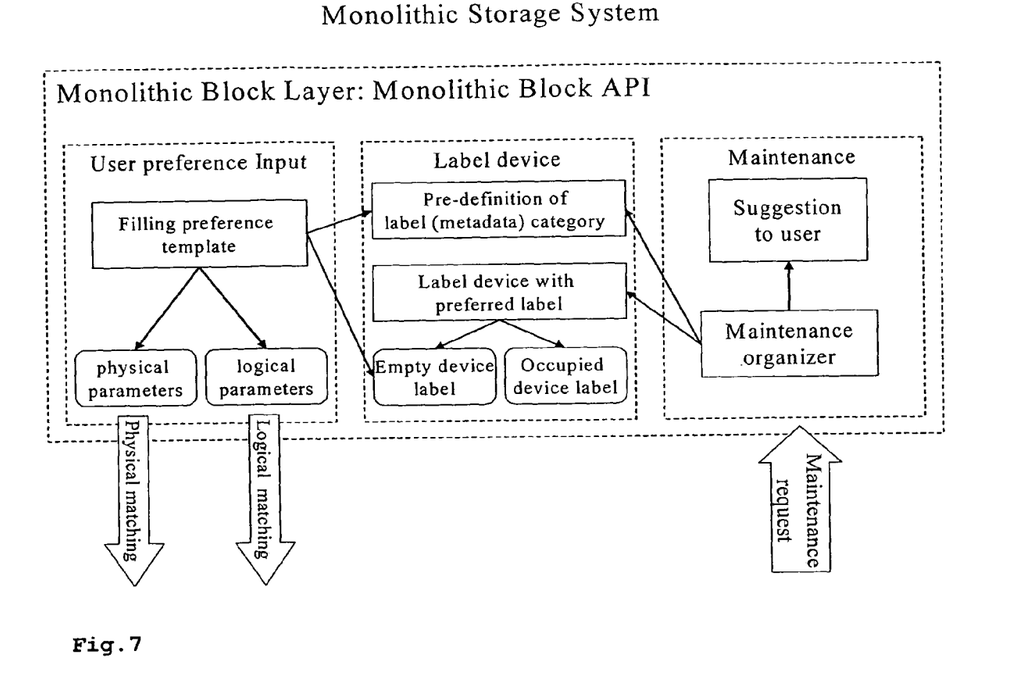
FIG. 7 Device initialisation for well-sorted storage strategy.

An important task during device initialisation for well-sorted storage is to find out dominant data types in occupied storage devices. Occupied device labelling is different from that of empty devices, which may be labelled by users according to their capacity and characteristics. It is assumed that occupied storage devices have already been optimally utilised by users according to their own interests. What the system needs to do is to find out the preferred data type(s) in occupied devices. According to the invention, the following dominating strategy is used, as illustrated in FIG. 7.

It is assumed that a storage device contains data of more than one data type, such as video (e.g. like DVD), audio (e.g. MP3), text (DOC), etc.

A dominant data type of a storage device is the data type with the dominant total number of files or total size of files in the storage device, as both are considered as an indication of dominance. The product of these two values is computed, and the dominant data type is understood as the data type with the highest value of this product. The dominant data type is defined as the preferred data type for the respective device, and the device will be labelled with this data type.

New incoming data will be stored according to this dominant data type and the potential free storage capacity related with this type. When new data are to be stored, the following process can be performed: first the data type and if possible data size of the new data is determined, then a message is sent to the connected storage devices indicating the data type and the data size (or estimated data size), whereupon the receiving devices evaluate the request, and matching devices (i.e. those whose dominant data type equals the requested data type) answer e.g. with their available capacity and transfer bandwidth, and from these answers the best matching device is selected for storage.

In an exemplary embodiment being a practical application, the preferred data type is calculated according to the following formulas:

$$A_{total} = N_{total} \times S_{total}$$

$$S_{average} = S_{total}/N_{total}$$

$$RPSC = 1 - (S_{average} + C_{used})/C_{total}$$

$$E_{dominant} = RPSC \times A_{total}$$

where $N_{total}$ is total number of data files of a certain data type, $S_{total}$ [GByte] is the total file size a certain data type, $S_{average}$ [GByte] is the average file size of a certain data type, $C_{used}$ [GByte] is the occupied storage capacity of the device, i.e. the sum of all $S_{total}$ of all data types, $C_{total}$ [GByte] is the total storage capacity of the device, $A_{total}$ is a data dominant "diagram area" (see below), being the above-mentioned product of file number and file size, RPSC is the storage devices Relative Potential Storage Capacity of a certain data type, wherein a positive value means that a further file of the same data type is expected to fit in the device, and a high value means that a high capacity for further files of the same type remains, and $E_{dominant}$ is the evaluation value of a certain data type for determining the dominant data type which is the type with the highest value of $E_{dominant}$.

In a more generalized form, the above equations are $$E_{dominant,type} = RPSC_{type} * A_{total,type} * k_1$$

$$RPSC_{type} = k_2 - k_3(k_4 + S_{average} + C_{used})/C_{total}$$

where $k_1$, $k_2$, $k_3$, $k_4$ are constants(or quasi-constants for the time of evaluation of the $E_{dominant,type}$ values of different nodes). In the above-mentioned form of the equation, the constants are $k_1=k_2=k_3=1$ and $k_4=0$.

Figure 8:
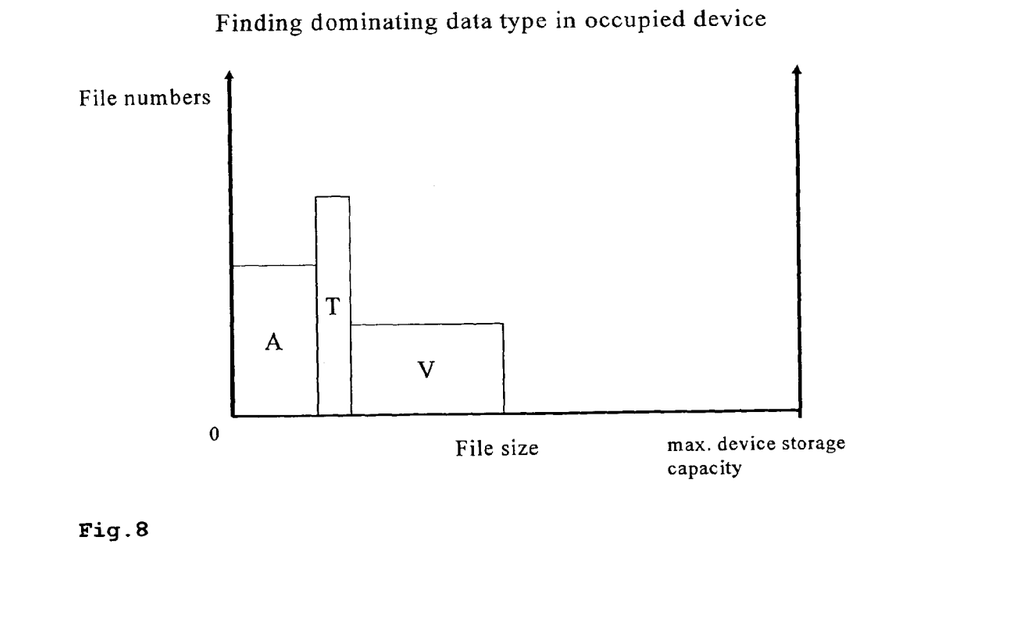
FIG. 8 Data type total "area" in a storage device.

The value of $A_{total}$ shows the quantised amount of a data type with respect to both its total file size and the number of files, and corresponds to the areas of the rectangles in FIG. 8. Exemplarily, in FIG. 8 a storage device contains video, audio and text data. The horizontal axis shows the file size and the vertical axis shows the number of all files of the respective data type. Total file sizes are within the maximum device storage capacity. The total data "area" ($A_{total}$) of each data type (video, audio, text) indicates the data type preference in this storage device.

$S_{average}$ gives the average file size of unit data of each data type in the current device. For an incoming data stream of unknown size, the size can be estimated by using the associated $S_{average}$. The RPSC (Relative Potential Storage Capacity) can evaluate the current storage devices potential storage capacity for to-be-expected incoming data of a data type, according to the average file size of already stored data of the same type. Generally, the RPSC is calculated from file size statistics of the respective data type, e.g. average file size, average file size deviation etc., and it can be used to estimate whether or not incoming data of unknown size can be stored. If the incoming data turns out to be more than estimated, file splitting can be used to save the remaining data on another device.

Finally, the dominant data type in the current device can be evaluated by the multiplication of RPSC and $A_{total}$. The resulting value $E_{dominant,type}$ means: the dominant data type in an occupied storage device is the data type that has the maximum in terms of both total number of data files and total data size, and the current device can potentially receive more new incoming data of the same type.

The storage device is then labelled with its dominant data type. This means that data of this type are "welcome" to be stored on this storage device.

TABLE 2

Calculation example for dominant data type

| | Data type | Size $S_{total}$ [GB] | Number $N_{total}$ | Data "Area", $A_{total}$ | RPSC | Evaluation value for dominant type $E_{dominant}$ |
|---|---|---|---|---|---|---|
| Device A 200 GB | Video | 50 | 10 | 500 | 0.70 | 347.50 |
| | Audio | 5 | 60 | 300 | 0.72 | 215.88 |
| | Text | 1 | 200 | 200 | 0.72 | 144.00 |
| Device B 200 GB | Video | 50 | 10 | 500 | 0.67 | 335.50 |
| | Audio | 10 | 50 | 500 | 0.69 | 347.00 |
| | Text | 1 | 500 | 500 | 0.69 | 347.50 |

Tab. 2 shows a calculation example for a dominant data type in an occupied storage device. In the example, device A has a storage capacity of 200 GByte. It is occupied by three groups of data types: video, audio and text data. Using above formula, it can be evaluated that the dominant data type in device A is "video type", because of its maximum $E_{dominant}$ value.

Device B has the same total storage capacity as device A, but it contains different numbers and sizes of video, audio and text data. All data type groups have the same "data area" in a diagram according to FIG. 8. In this case, the dominant data type is evaluated by the values of $E_{dominant}$. In device B, the dominant data type is "text", because its value $E_{dominant,text}$ is higher than the values for video and audio $E_{dominant,video}$, $E_{dominant,audio}$. If data of other types are stored, they may either be ignored if their amount is low compared to video, audio and text, or separate evaluation values $E_{dominant}$ are calculated.

As shown in the example, the formulas described in this section are efficient for evaluating the dominant data type in an occupied storage device.

Monolithic Block System

Searching a storage device is performed on the MBL. It is under control of the input parameters from the AL. When saving incoming data to the monolithic storage block, a user may define an associated searching strategy and parameters through the AL. Afterwards, according to this strategy and parameters, the MBL can search an appropriate storage device automatically. If no user input parameter is present, the MB system will run according to the default matching strategy to look for an appropriate storage device. More details are given below.

Figure 9:
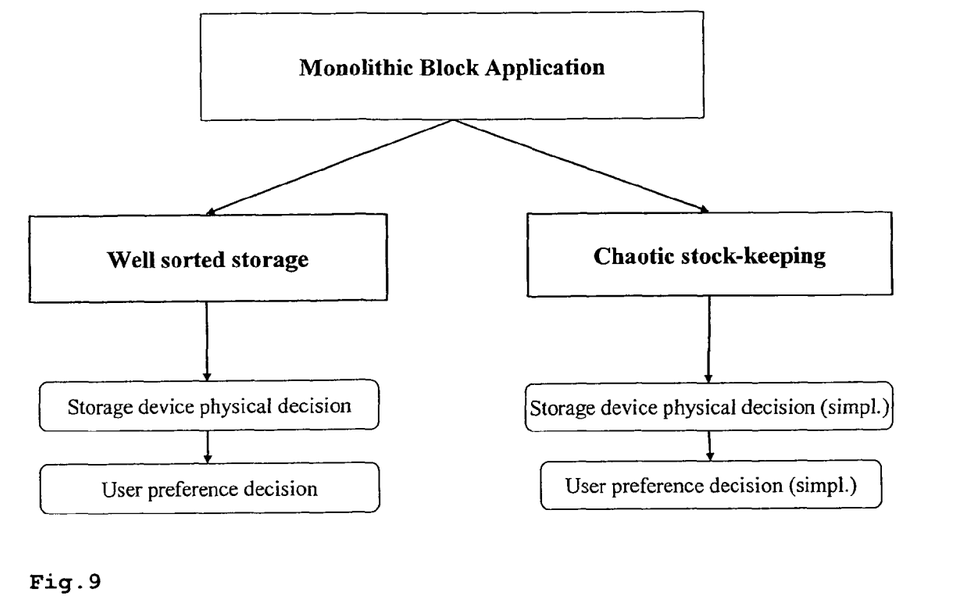
FIG. 9 Monolithic block system overview.
Figure 10:
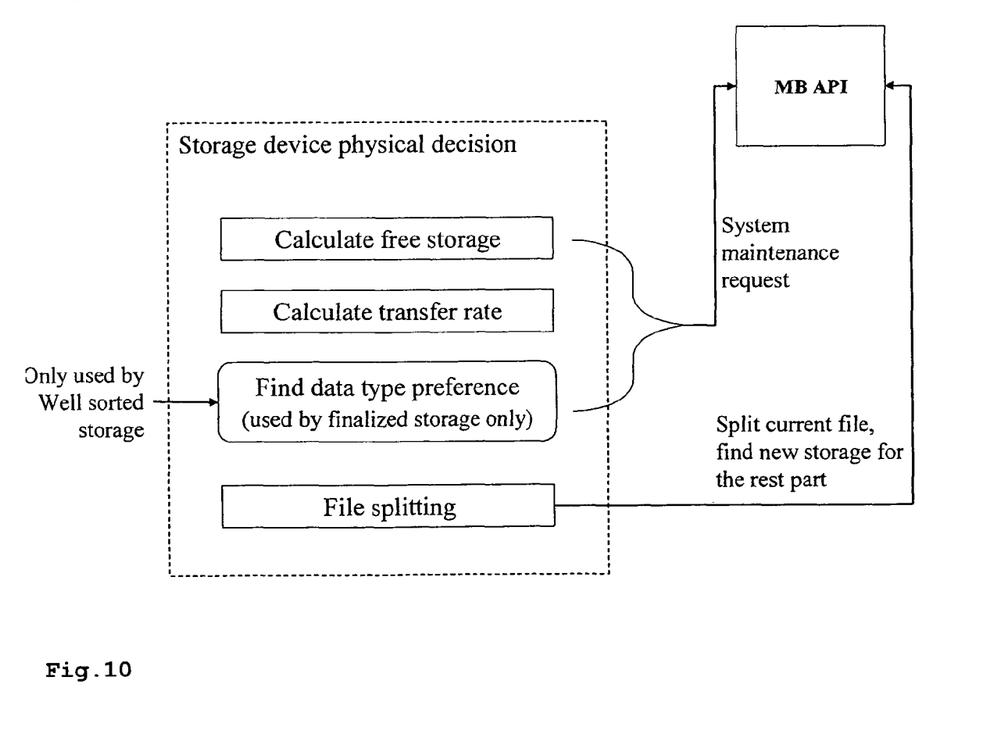
FIG. 10 Storage device physical decision.

After the system initialisation process described above the MBL may undertake further storage device searching activities. The searching activity is run automatically based on default parameters or user assigned parameters. FIG. 9 provides an overview of the whole Monolithic Block (MB) system. The MB system can be realised according to one of two storage strategies: chaotic stock keeping and well-sorted storage, as described above. Both storage forms use similar evaluating procedures called "storage device physical decision" and "user preference decision".

Figure 3:
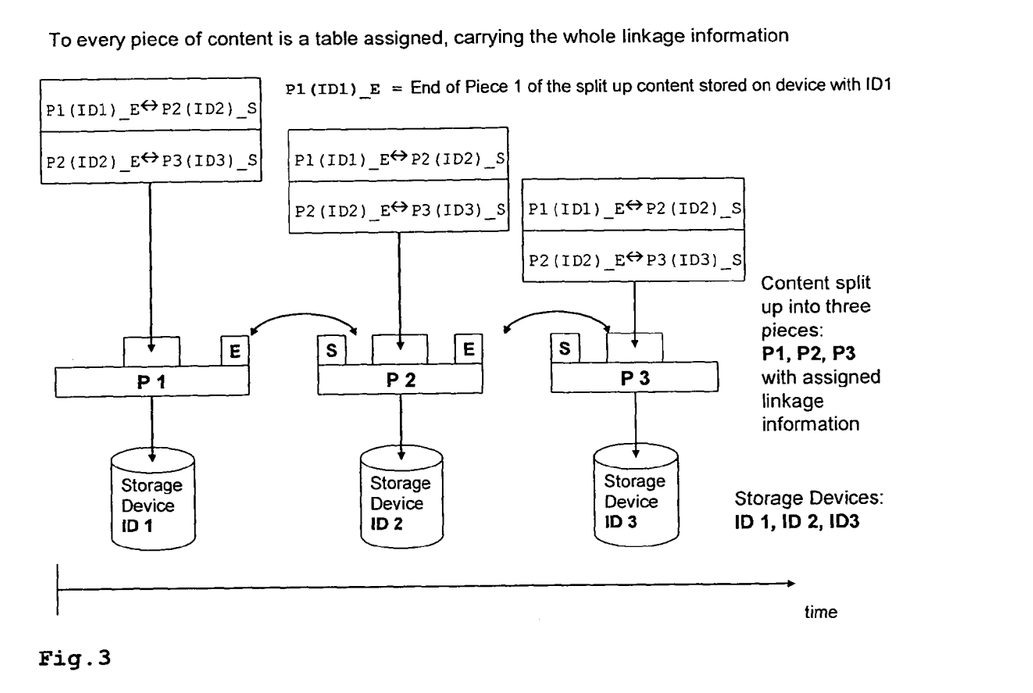
FIG. 3 File Splitting Principles.

The storage device physical decision plays an initial role in the storage device selection for the MB application. It evaluates basic physical parameters and may include the following steps: calculating the devices free storage capacity, calculating the devices transfer rate, asking for the devices preferred data type (in case of well-sorted storage), and activating file splitting if necessary: If the amount of data is not known before storing or no storage device having enough free capacity is available, it is possible to distribute the data over several storage devices. This so called "File Splitting" mode, as shown in FIG. 3, can be supported by the DSS.

Chaotic stock keeping and well-sorted storage use different versions of the storage device physical decision: Chaotic stock keeping uses only a simplified version of the physical decision as compared to well-sorted storage.

The user preference decision plays a final selection role for the application, thus leaving final decisions to the user preferences. It utilises predefined default parameters or user-updated logical parameters (descriptive metadata) to provide the final selection. It may consist of the steps of physical storage matching and logical storage matching (for well-sorted storage).

Physical storage matching evaluates the devices physical parameters based on predefined formula and strategy. The main difference between "storage device physical decision" and "physical storage matching" is that the former evaluates the absolute value and the latter evaluates the relative value of the devices physical parameters.

Physical storage matching includes the following steps: Calculating relative storage capacity for incoming data, system balancing evaluation by predefined strategy (for well-sorted storage), and activating safe-copy action (for well-sorted storage, if activated by the user).

For well-sorted storage, logical storage matching evaluates devices only according to user-input metadata (received from the AL). Based on logical storage matching, the monolithic storage system may satisfy all kinds of storage requirements of users.

More details about the Monolithic Block Layer will be discussed in the following.

Chaotic Stock-Keeping

As shown in FIG. 9, the procedure of searching "chaotic stock keeping" devices can be realised based on two steps: storage device physical decision and user preference decision. Compared with well-sorted storage, searching for chaotic stock keeping uses only a simplified process for these steps. E.g. in storage device physical decision processing, only the devices absolute free storage capacity and transfer rate are evaluated; in the user preference decision, only the devices relative free storage capacity (under the sub-category physical matching) is evaluated.

The basic tasks for chaotic stock keeping devices are to provide storage space for incoming data, while more metadata-dependent optimal device evaluation and data sorting is not considered.

Temporary chaotic stock keeping can be further transformed into the well-sorted storage at an appropriate time.

Well-Sorted Storage

Searching for a well-sorted storage device can also be realised in the two steps of storage device physical decision and user preference decision. The steps of operation are similar to those of chaotic stock keeping but use a full version of the associated processing. In storage device physical decision processing, besides absolute device free storage capacity and device transfer rate, also device preferred data types are evaluated; in user preference decision processing, besides relative free device storage capacity (under sub-category physical matching), also system parameter balancing evaluation (in physical matching) and logical matching take place. In logical matching, more descriptive metadata features are considered. A "safe copy" processing is also possible for finally assigned storage.

Storage Device Physical Decision

Storage device physical decision is the initial selection process for both chaotic stock keeping and well-sorted storage device searching. It consists of four operations: Device free storage capacity evaluation, device transfer rate evaluation, device-preferred data type evaluation (for well-sorted storage), and generating a file splitting command if necessary.

The devices free storage capacity evaluation and devices transfer rate evaluation may be used by all storage strategies. Absolute free storage capacity and transfer rate physical parameters are calculated.

The device-preferred data type evaluation is used only when searching for well-sorted storage devices, which sort incoming data according to its data type, such as video, audio (MP3), etc.

When the size of incoming data is too big to be loaded into a single device, a file splitting command is generated. This process can be activated on the AL by user definition. Once a file splitting command has been generated, the MB system will determine another storage device for saving the rest of the data.

Usually, file splitting is an automatic function. In some cases however, a user might launch the command to split the data.

User-Preferred Decision

Figure 11:
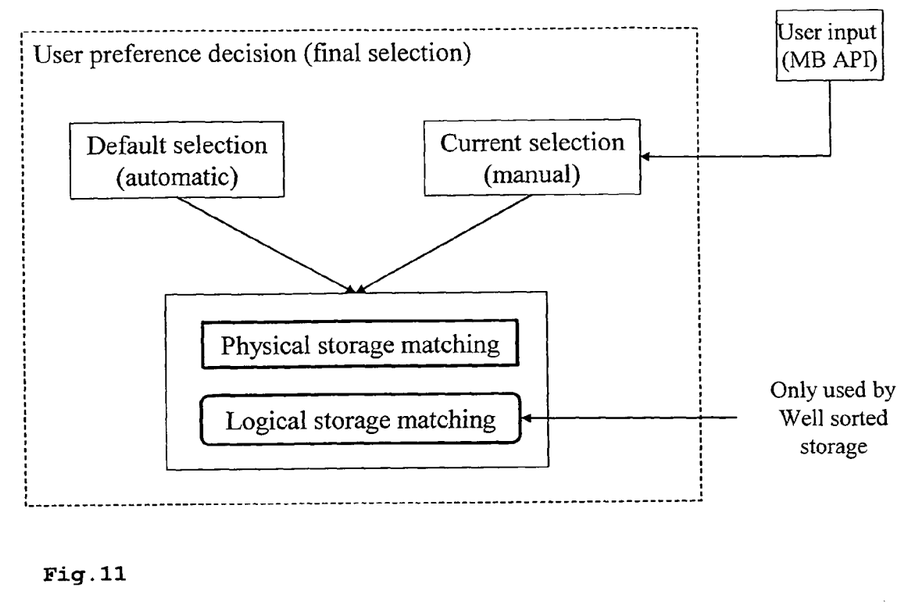
FIG. 11 User preference decision.

User preference decision is the final selection process for both, chaotic stock keeping and well-sorted storage device searching. It is illustrated in FIG. 11 and consists of physical storage matching and logical storage matching (for well-sorted storage).

For these matching processes both default parameters and updated user input parameters can be applied. Default parameters are predefined by the MB application. These pre-defined parameters may be included in a parameter control template used on AL. Based on these default parameters, the MB system may carry out matching tasks automatically without any user command. A user may update default parameters by changing associated values in the parameter template. The current user input parameters provide the user the possibility to control the system in order to find user preferred storage devices.

Physical Storage Matching

Figure 12:
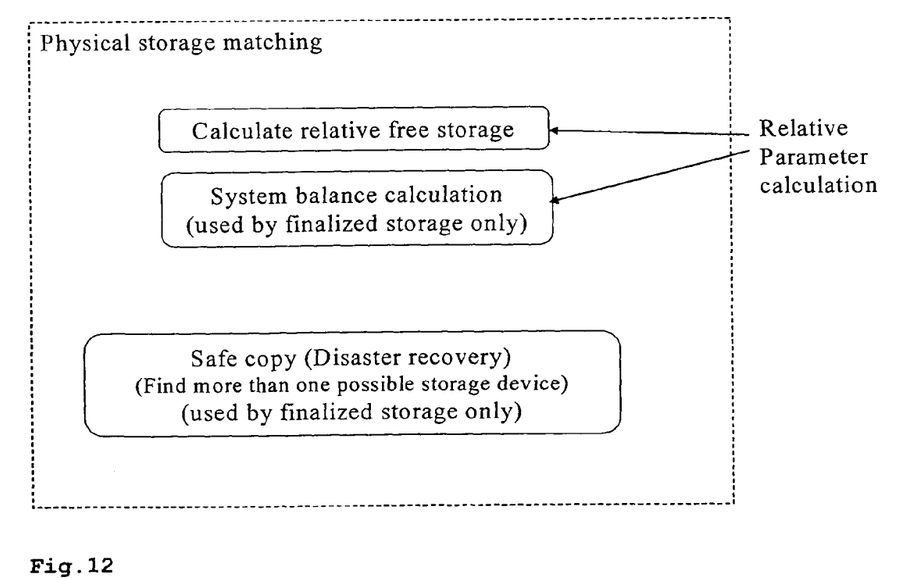
FIG. 12 Physical storage matching.

Physical storage matching, as illustrated in FIG. 12, includes the following functions: Evaluation of the devices relative free storage capacity (RFSC), system parameter balancing evaluation, and generating a safe copy command.

The process of relative free storage capacity (RFSC) evaluation is used by both, chaotic stock keeping and assigned storage. Similar to RPSC (relative potential storage capacity) described above, the RFSC is calculated according to the following formula for the data type of the incoming data:

$$RFSC = 1 - (S_{in\_data} + C_{used})/C_{total}$$

where $C_{used}$ [GB] is the used storage capacity of the device,
$C_{total}$ [GB] is the total storage capacity of the device,
$S_{in\_data}$ [GB] is the size of the incoming data which has a certain data type, and
RFSC is the relative free storage capacity of the storage device for this data type.

In a more generalized form, the above equation is $$RFSC = c_1 - c_2(c_3 + S_{in\_data} + C_{used})/C_{total}$$

where $c_1$, $c_2$, $c_3$ are constants (or quasi-constants for the time of evaluation of the RFSC values of different nodes).

In the above-mentioned form of the equation, the constants are $k_1 = k_2 = k_3 = 1$ and $k_4 = 0$.

System parameter balancing evaluation is used only by well-sorted storage. It provides the possibility to define a complicated device matching strategy based on basic parameters. E.g. in the above-described relative free storage capacity evaluation, the device with the maximal RFSC value may not provide the best transfer rate for the incoming data. In this case, another device that may have a lower RFSC value but appropriate transfer rate may be selected as the best storage candidate for the incoming data. In the system parameter balancing evaluation, a user may define different practical strategies for the MB application.

If the safe copy function is activated on the AL by the user in case of physical storage matching, it can generate a safe copy command and run the above described device searching process again to find another storage device for saving the incoming data a second time. This additional data storage is useful for later disaster recovery if necessary.

Tab. 2 shows an example for selecting a device according to the relative free storage capacity. Device A has a total storage capacity of 200 GB(yte), and its dominant data type is "video". Device B provides 100 GB total storage capacity, and its dominant data type is also "video". If saving an incoming data of 10 GB to device A, the RPSC value of the incoming data in device A is 0.67. If saving an incoming data of 10 GB to device B, the RPSC value of the incoming data in device B is 0.72. Hence, for the incoming data, device B provides more relative free storage capacity than device B, so device B will be selected.

TABLE 2

Example for evaluating relative free storage capacity of devices (RFSC)

| | Data type | Size $S_{total}$ [GB] | Number $N_{total}$ | Data "Area", $A_{total}$ | RPSC or RFSC | Evaluation value for dominant type $E_{dominant}$ |
|---|---|---|---|---|---|---|
| Device A | Video | 50 | 10 | 500 | 0.70 | 347.50 |
| 200 GB | Audio | 5 | 60 | 300 | 0.72 | 215.88 |
| | Text | 1 | 200 | 200 | 0.72 | 144.00 |
| Incoming data | | 10 | 1 | | 0.67 | |
| Device B | Video | 15 | 5 | 75 | 0.79 | 59.25 |
| 100 GB | Audio | 2 | 30 | 60 | 0.82 | 49.16 |
| | Text | 1 | 50 | 50 | 0.82 | 40.99 |
| Incoming data | | 10 | 1 | | 0.72 | |

The above example shows that the formulas discussed above provide a quantitative evaluation for selecting a storage device for any incoming data.

Logical Storage Matching

After physical storage matching, candidate storage devices may further be filtered by a logical storage matching process. Logical storage matching is designed to utilise descriptive metadata to arrange incoming data on an appropriate device.

In principle all kinds of MD-based matching are acceptable. Both predefined and updated MD matching strategies can be applied for logical storage matching. The purpose of the logical storage matching strategy is to provide maximal opportunity to the user to allow saving data to a well-sorted storage device.

Figure 13:
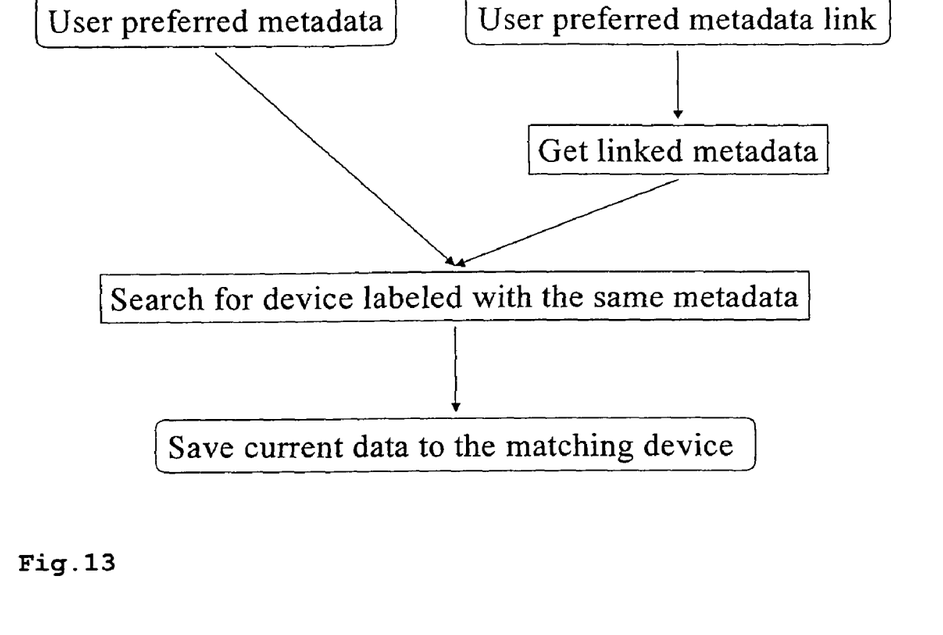
FIG. 13 Logical storage matching.

For a practical system application, a metadata-based matching method is possible, as shown in FIG. 13. In the system initialisation phase, the user may input preferred MD or a direct link to a preferred MD container so that the MD content in the container will be read as user-preferred MD. On the Application Layer, the user may use a parameter control template to input the above MD content. All system-acceptable descriptive MD categories may be predefined in the parameter template. The parameter template may also contain default MD content. If no updated user-preferred MD were given, the system uses default MD to run the logical storage matching process.

As shown in FIG. 13, the MB system will search for a storage device that is labelled by the same metadata as the user preferences. Finally, the incoming data will be saved to a storage device that satisfies both physical and logical storage requirements.

Exemplary Scenarios and Their Flow of Messages and Control Metadata

Figure 14:
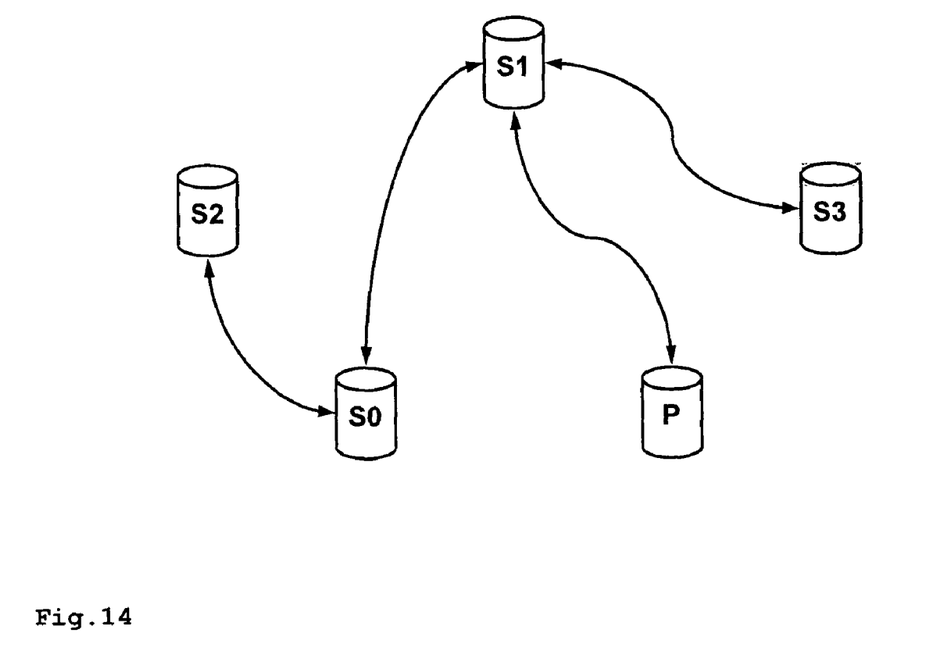
FIG. 14 an exemplary home network in the distributed storage scenarios.

Below, a few simple scenarios that describe possible applications of the DSS are given for demonstrating the feasibility of the system model and the control language required for distributed storage management, including exemplary associated messages and control metadata. The scenarios are based on an example network for distributed storage, as shown in FIG. 14. The network comprises stationary storage devices/nodes S0, . . . ,S3 (Personal Digital Recorder, e.g. HDD, optical disc), and a portable storage device/node P. Each node may run applications and has a user interface/remote control, which may also be considered as a separate device/node. Possible extensions towards a home network are tuner/receiver devices (e.g. DVB-S, DVB-C etc.), AV display/output devices, ADSL modems or gateways for Internet access etc. In the example scenarios, the node S0 is generally used to interact with the DSS.

Scenario 1: Copying Content in Case of Capacity Limitations and Well-Balanced Usage of Storage Capacity in a Network The user wants to copy content stored on P to any of the stationary storage devices S0, . . . ,S3. The content is copied to the stationary device offering the highest amount of free storage capacity. In another embodiment, the content is copied to the device offering the best-matching amount of free storage capacity, i.e. the device with a minimum of remaining capacity, so that the gap is optimally utilized.

Scenario 2: Pause and Resume, and Trick Modes (Fast Forward, Slow Motion)

While transferring content stored on S1 to P (e.g. for watching the content on a display device P), the user (through S0) pauses the transfer (e.g. playback) and resumes it after a few minutes. Later, during the playback at normal speed again, the user selects some trick playback such as fast forward or slow motion (maybe also thumbnails browsing, video grouping scene browsing etc.). Device S1 is checked for its trick mode capabilities, and if confirmed, device S0 sends a fast forward request message to device S1 to make it change to the desired fast forward mode and speed.

Scenario 3: Multitasking with Simultaneous Read and Write (Recording and Playback) from/to One Storage Device S1

A node S1 runs two tasks simultaneously: recording a piece of content received from S2, and playback of another piece of content to P.

Scenario 4: Simultaneous Read and Write with Tasks Conflict and Delayed Transfer Similar to scenario 2, a user wants to set up a record transfer from S2 to S1, and device capabilities allow this to happen. But before initiating the transfer, another user has started another playback transfer from S to P so that the free transfer rate of S1 is no longer sufficient to facilitate the transfer from S2 to S1, and this transfer is denied. The user decides to schedule that transfer to happen at a later time. The transfer from S2 to S1 is now set up accordingly.

Scenario 5: Plugging and Unplugging of Devices

The user plugs his portable device (P) into the existing network consisting of devices S0, . . . ,S3 and unplugs it later.

"Soft unplugging" initiated through software and "hard unplugging" by forced disconnection are distinguished.

Scenario 6: Simultaneous Read and Write with Tasks Conflict and Non-Real-Time Transfer Similar to scenario 4, except that instead of a delayed transfer a non-real-time transfer is carried out: The content is transferred as a file at a lower bit rate and consequently over a longer time, the product, which is the storage space, remains constant.

Scenario 7: Recording with Content Splitting

A piece of content is recorded and spread over several nodes since none of them is able to store the whole content.

Scenario 8: Playback of Split Content

A piece of content spread over several nodes is played back seamlessly.

Scenario 9: Instantaneous Recording with Later Content Splitting

Recording is started on one node while the end is no yet know, and when the device is almost full, recording is continued on another node.

Scenario 10: Content Deletion

A piece of content that has been searched and found is now deleted.

Scenario 11: Multicast/Broadcast

A piece of content is transferred to several (multicast) or all nodes (broadcast) simultaneously.

Scenario 12: Transfer Interruption and Resumption

Transfer of a piece of content is interrupted since the source or destination becomes unavailable temporarily due to hard unplugging. Three plus two cases are distinguished, and in two of them the transfer is resumed from the point where it has been interrupted.

The following constructs may exemplarily refer to the above-mentioned peer-to-peer technology layer, or another corresponding layer. In realising the scenarios given above, different messages or tasks are used along with specific control metadata contained in them as message parameters or arguments. For the ease of writing, messages are represented by message name and arguments, e.g. DeviceCapabilitiesInformation (Sender, Receiver, TaskID, DeviceType, DeviceServices, MaxBitRate, FreeStorageCapacity, . . . ). While every message has its own MessageID, the MessageID is omitted in the above representation for simplicity.

For each scenario, the initial condition is given first, followed by the detailed description of the scenario, and finally the message flow.

Figure 15:
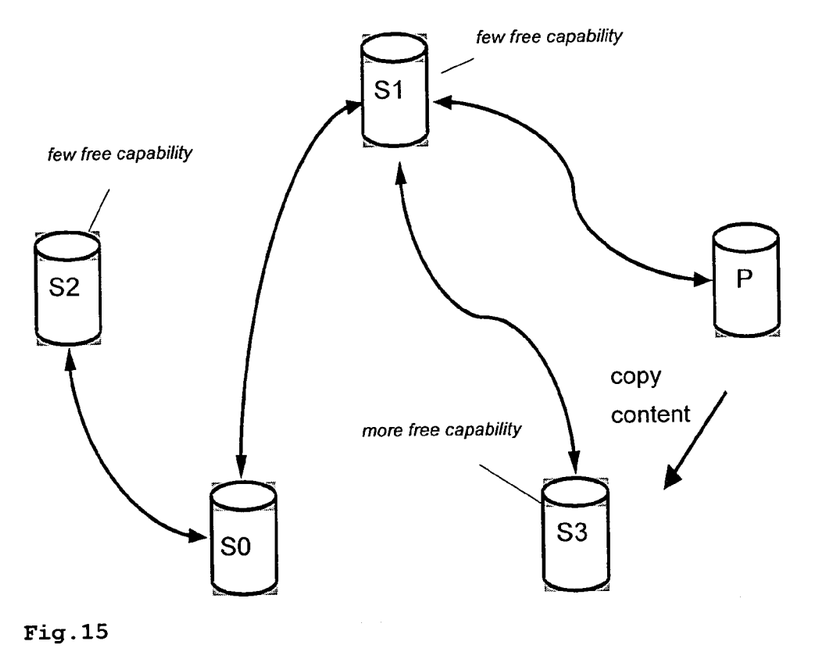
FIG. 15 copying content in case of capacity limitation.

Scenario 1: Copying Content in Case of Capacity Limitations and Well-Balanced Usage of Storage Capacity in an OwnerZone Initial condition: The network consisting of nodes S0, . . . ,S3 and P is up and running, as in FIG. 15. There is no transfer of content taking place, all nodes are idle.

The scenario: The user wants to copy content stored on P to any of the stationary storage devices S1, S2, or S3. The stationary storage device offering the highest amount of free storage capacity is determined, and the content is copied to it.

The user utilises device S0 to search a desired piece of content: device S0 sends a search request message to all devices in the network/OwnerZone. Device P contains the content and replies to S0. As a variation "A" to this scenario, device P may be used instead of S0 to initiate the tasks of searching and copying content. In this case, the node P would not send a reply about content matching the request to itself; it just would get the corresponding information from its content database.

Since the user wants to store the content on any stationary storage device, device S0 is used to ask devices S1, S2 and S3 for their storage and transfer capabilities. S1, S2 and S3 inform S0 about their device capabilities, they all have sufficient free transfer rate available. Limitation in free storage capacity is observed for device S1, while S3 offers the highest amount of free capacity. Device S0 requests P to transfer the content to S3 accordingly, thus making use of the storage capacity available in the network in a well-balanced way. After finishing the associated data transfer P notifies S3. After recording the content, S3 informs S0 about the successful completion.

Well-balanced usage of storage capacity in an OwnerZone, i.e. managing storage space of the nodes, means e.g. to record a piece of content on the node offering the highest absolute or relative free storage capacity (as in this scenario), or highest free transfer rate, depending on implementation. The well-balanced usage of storage capacity, however, is only one possible way for managing the storage capacity in the network. Other strategies could be applied as well when copying content, e.g. in case of capacity limitation.

The message flow: The following sequence of messages occurs in this scenario. All messages contain the Sender and Receiver. They also contain parameters specific to the respective message type:

The user wants to search for a certain piece or type content. As a result of his input the S0 device sends the following search request to all devices; since S0 has some pre-knowledge about or is interested in S2 especially, S0 sends the message specifically to S2:

ContentInfoRequest (Sender=NodeID(S0), Receiver=all, Receiver=NodeID(S2), TaskID=abc, TaskInitTime=2002-12-01-18:10:08.012-GMT, MessageMode="search", Search String={Title="Octopussy"})

All devices store the association of the TaskID and the task-related parameters temporarily and search their data bases. P finds the requested piece of content, so it sends back the following message to S0:

ContentInfoResponse (Sender=NodeID(P), Receiver=NodeID(S0), TaskID=abc, MessageMode="found content", ContentID=UUID, LocationID=UUID, ContentDescription={Title="Octopussy", Summary=" . . . ", Actor="Roger Moore", Actor="Maud Adams", Actor=" . . . ", Genre="Action", Keyword="James Bond", . . . , AspectRatio= "16:9", . . . }, Duration=2:05 h, BitRate=7 Mbps, [, more information about the content])

In variation "A" to this scenario where device P instead of S0 is used to initiate the tasks of searching and copying content, this message would not occur, node P would just get the information about found content from its content database.

Since "all" receivers have been addressed in the ContentInfoRequest ("search") message there is no need for a receiver to respond to the request unless it finds content matching the request. S2 however is explicitly mentioned as a receiver, and thus must respond to the request whether it holds the desired content or not. S2 needs some time to search its database and sends the following message to S0 when it begins searching:

ContentInfoResponse (Sender=NodeID(S2), Receiver=NodeID(S0), TaskID=abc, MessageMode="searching")

Device S2 does not find the requested piece of content. Because S2 has been addressed as a "must respond" receiver in the ContentInfoRequest ("search") message, it sends back the following message to device S0, although the desired content was not found in S2:

ContentInfoResponse (Sender=NodeID(S2), Receiver=NodeID(S0), TaskID=abc, MessageMode="found content", LocationID="none")

If the user found some content he likes before the search process of all devices has been completed, he may let S0 cancel the search process using the following message:

CancelTaskRequest (Sender=NodeID(S0), Receiver=all, TaskID=abc)

After receiving this message, all devices stop their search process. Because S2 has been addressed as a "must respond" receiver in the ContentInfoRequest ("search") message, it sends back the following message to S0 to confirm the CancelTaskRequest ("search") request:

CancelTaskResponse (Sender=NodeID(S2), Receiver=NodeID(S0), TaskID=abc)

After sending the ContentInfoResponse message to S0, nodes P and S2 delete the TaskID and the associated parameters from their temporary memory. The same holds for any device sending a CancelTaskResponse message.

The user is satisfied with the search result, and S0 now sends request messages to S1, S2 and S3 asking for their device capabilities, in order to find out their free storage capacities and transfer rates. Devices S1, S2 and S3 respond by informing S0 about their device capabilities:

DeviceCapabilitiesInfoRequest (Sender=NodeID(S0), TaskID=bcd, Receiver=NodeID(S1))

DeviceCapabilitiesInformation (Sender=NodeID(S1), Receiver=NodeID(S0), TaskID=bcd, DeviceCapabilityInformation{DeviceType=stationary storage device, DeviceServices=record or playback, MaxCapacity=100 GB, FreeCapacity=5 GB, MaxTransferRate=30 Mbps, FreeTransferRate=20 Mbps, MaxStreams=2 [, ActiveStreams=1, Until=20:15:00: 00]})

DeviceCapabilitiesInfoRequest (Sender=NodeID(S0), Receiver=NodeID(S2), TaskID=cde)

DeviceCapabilitiesInformation (Sender=NodeID(S2), Receiver=NodeID(S0), TaskID=cde, DeviceCapabilityInformation{DeviceType=stationary storage device, DeviceServices=record or playback, MaxCapacity=50 GB, FreeCapacity=40 GB, MaxTransferRate=30 Mbps, FreeTransferRate=30 Mbps, MaxStreams=2})

DeviceCapabilitiesInfoRequest (Sender=NodeID(S0), Receiver=NodeID(S3), TaskID=def)

DeviceCapabilitiesInformation (Sender NodeID(S3), Receiver=NodeID(S0), TaskID=def, DeviceCapabilityInformation{DeviceType=stationary storage device, DeviceServices=record or playback, MaxCapacity=300 GB, FreeCapacity=200 GB, MaxTransferRate=40 Mbps, FreeTransferRate=40 Mbps, MaxStreams=2})

Alternatively, S0 can also send the RequestDeviceCapability message to all three nodes as follows:

DeviceCapabilitiesInfoRequest (Sender=NodeID(S0), Receiver=NodeID(S1), Receiver=NodeID(S2), Receiver=NodeID(S3), TaskID=bcd).

S0 evaluates the free capacities and transfer rates of S1, S2 and S3. S1 does not have sufficient free storage capacity, while S3 offers the highest amount of capacity. In order to make well-balanced use of the storage capacity of the stationary storage devices in the network, S0 automatically selects S3 for recording the content from P, without the user being required to interact, and requests S3 and P to perform the transfer:

InitiateTransferRequest (Sender=NodeID(S0), Receiver=NodeID(S3), Receiver=NodeID(P), TaskID=fgh, TransferPurpose="Record", Destination=NodeID(S3), Source=NodeID(P), ContentID=UUID, LocationID=UUID, ContentDescription={Title="Octopussy"}, Duration=2:05 h, [Start=00:00:00:00, End=02:05:00:00,] RequestedBitRate=7 Mbps, UseKey=Key(John's James Bond friends))

In variation "A" to this scenario, one Receiver would be omitted and the message would just start:

InitiateTransferRequest (Sender=NodeID(P), Receiver=NodeID(S3), TaskID=fgh, ... ). In this case, node P is allowed to launch this InitiateTransferRequest only if it has the necessary resources available.

This message requests that the piece of content under the location on node P shall be transferred to node S3 and recorded there. The ContentID is a UUID specifying the location of the data on node P. The TaskID is a UUID and could e.g. be defined based on the NodeIDs of the devices involved, the location of the data to be transferred, and the time when the task was initiated. If device P and/or S3 were too busy at the moment according to their FreeTransferRate, they send InitiateTransferResponse ("denied") message to S0; the task would then be cancelled by S0 by sending a CancelTaskRequest message to P and S3, answered by them through CancelTaskResponse messages to S0; or recording could be tried again later or scheduled using the After parameter according to the Until obtained from the DeviceCapabilitiesInformation messages.

After receiving the message above, S3 and P confirm the request and allocate respective resources. In variation "A" to this scenario, node P would not send a confirmation message to itself and S3 since it is implicitly known to have sufficient resources available; so the second of the following two InitiateTransferResponse messages would not occur. The user wants to grant access to the content copy to a certain group of people he manages under the label "John's James Bond friends" defined by himself, and instructs S0 accordingly:

InitiateTransferResponse (Sender=NodeID(S3), Receiver=NodeID(S0), Receiver=NodeID(P), TaskID=fgh, MessageMode="confirmed", TransferPurpose="Record", Destination=NodeID(S3), Source=NodeID(P), ContentID=UUID, LocationID=UUID, ContentDescription={ Title="Octopussy"}, [Start=00:00:00:00, End=02:05:00:00,] ReservedBitRate=7 Mbps, UseKey=Key(John's James Bond friends))

InitiateTransferResponse (Sender=NodeID(P), Receiver=NodeID(S0), Receiver=NodeID(S3), TaskID=fgh, MessageMode="confirmed", TransferPurpose="Record", Destination=NodeID(S3), Source=NodeID(P), ContentID=UUID, LocationID=UUID, ContentDescription={Title="Octopussy"}, [Start=00:00:00:00, End=02:05:00:00,] ReservedBitRate=7 Mbps, UseKey=Key(John's James Bond friends))

Since the value of the TransferPurpose parameter is "Record", the Destination node S3 will control the data forwarding process: S3 requests then (or later, according to the After parameter) P to send the respective content data to it:

ForwardDataRequest (Sender=NodeID(S3), Receiver=NodeID(P), TaskID=fgh, ContentID=UUID, LocationID=UUID, [ContentDescription={Title="Octopussy"},] [Start=00:00:00:00, End=02:05:00:00])

Device P receives the request from S3, and sends the following response message to S3 accompanied with the requested content, thus starting to transfer content data from P to S3:

ForwardDataResponse (Sender=NodeID(P), Receiver=NodeID(S3), TaskID=fgh, ContentID=UUID, LocationID=UUID, [ContentDescription={Title="Octopussy"},] [Start=00:00:00:00, End=02:05:00:00,] BitRate=7 Mbps, Content)

S3 now informs S0 about the start of the recording process so that the user can be notified:

TransferStatusInformation (Sender=NodeID(S3), Receiver=NodeID(S0), TaskID=fgh, MessageMode="starting" [, TransferPurpose="Record", Destination=NodeID(S3), Source=NodeID(P), ContentID=UUID, LocationID=UUID, ContentDescription={Title="Octopussy"}] [, Start=00:00:00:00, End=02:05:00:00] [, BitRate=7 Mbps])

Since S3 controls the transfer (starting it through the ForwardDataRequest message), S3 sends the TransferStatus-Information ("starting") message to S0. When P finishes the data transfer, it sends the following information message to S3, thus confirming that the complete data have been transferred (if this message would not be received, S3 could use this fact as an indication that the transfer was incomplete due to some reason, e.g. due to forced device unplugging):

TransferStatusInformation (Sender=NodeID(P), Receiver=NodeID(S3), TaskID=fgh, MessageMode="end of data", ContentID=UUID, LocationID=UUID [, ContentDescription={Title="Octopussy"}] [, Start=00.00:00:00, End=02:05:00:00])

S3 finishes the recording and sends the following information message about the successful completion of the recording to S0 so that it can notify the user:

TransferStatusInformation (Sender=NodeID(S3), Receiver=NodeID(S0), TaskID=fgh, MessageMode="completed" [, TransferPurpose="Record", Destination=NodeID(S3), Source=NodeID(P), ContentID=UUID, LocationID=UUID, ContentDescription={Title="Octopussy"}] [, Start=00:00:00:00, End=02:05:00:00] [, Duration=02:05 h, BitRate=7 Mbps] [, StorageSpace=6.11 GB])

Devices P and S3 deallocate their resources, and S0 now notifies the user about the successful completion of the transfer task.

Figure 16:
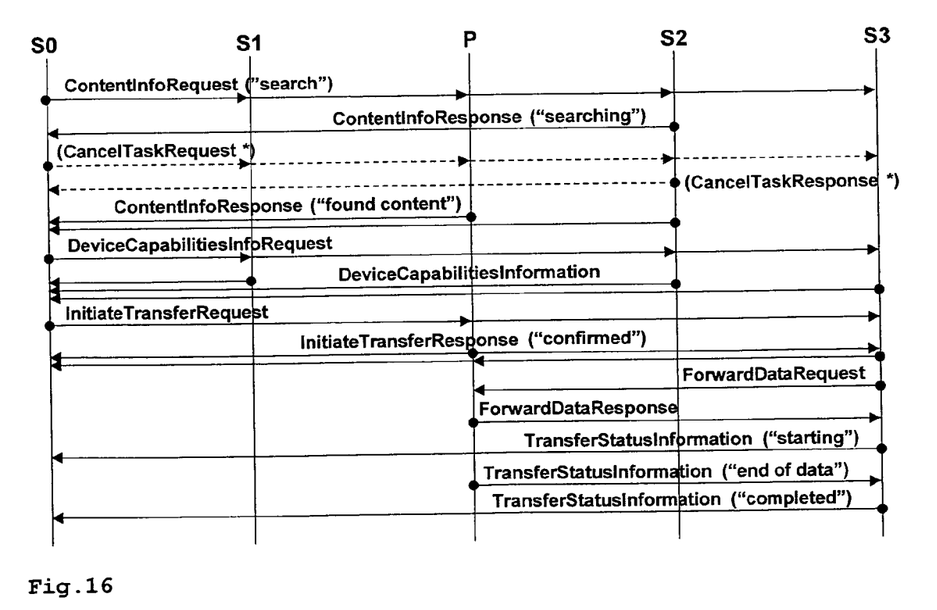
FIG. 16 message sequence chart for scenario 1: copying content in case of capacity limitation.

These steps can be depicted by a message sequence chart, as shown in FIG. 16.

The invention can preferably be applied within self-contained networks, where network devices have a certain degree of autonomy. In particular, the network devices are assumed to be more than clients in client-server architectures. Preferably the network devices may act as client and server simultaneously, such as peers in a P2P architecture, as exemplarily disclosed in the European Patent Application EP1427149. Further, the network may be connected to other networks, but this connection is generally regarded as "external", unless it is explicitly defined as "internal". Storage devices connected via external connections are regarded as external devices, and can generally not be included in a Monolithic Block (MB).

It can be a matter of consideration when regarding the storage devices in the network as one MB where the user does not need to distinguish between them. One possibility is that all network devices are part of the MB. This may mean that also small devices with low storage capacity are considered.

In one embodiment, an automatically determined storage device is understood as a proposal, and needs to be confirmed by the user.

Another possibility is that only those network devices are included in the MB that provide at least a minimum of resources, e.g. total storage capacity, data transfer rate, or certain services. Minimum requirements for such devices may be locally defined and can be modified by the user, and are determined automatically when a device is connected.

E.g. a newly connected device is requested to provide its capabilities to the other devices, or to a particular service. If it has e.g. 1 Gbyte or more total storage capacity and its connection bandwidth not permanently allocated for other purposes, it will be included in the MB. If it has already data stored when it is connected, these data (if not protected) will be available within the network via the MB application. If the devices capabilities are not sufficient, it may be regarded not as a storage node with respect to the MB, but e.g. an input/output node or other special purpose node. The user may however configure his network, so as to explicitly exclude or include a device in a MB and/or add or modify rules that determine which devices are considered as part of the MB.

What is claimed is:

1. A method for automatic classification of a node in a network, comprising the steps of
   determining at least one data class;
   automatically classifying data stored on said node according to said at least one data class;
   determining the amount of the data classified according to said at least one data class, wherein the determining the amount of the data classified according to said at least one data class comprises determining the number of files stored on said node which are classified according to said at least one data class and the average size of said files;
   calculating, from the determined amount of the data classified into said at least one data class and a relative potential storage capacity, a dominance value for each of said at least one data class, said dominance value being a measure for the relative dominance of the data stored on the node classified according to one of said at least one data class to all other of said at least one data class;
   receiving a request that indicates a data type corresponding to one of said at least one data class; and
   providing, in response to the request, said dominance value for said one of said at least one data class corresponding to said data type.

2. The method according to claim 1, wherein the amount of data is determined in terms of a combination of said file sizes and said number of files.

3. The method according to claim 1, wherein the relative potential storage capacity of a storage device on said node is automatically estimated, said estimating comprising the steps of:
   determining a data type of data already stored on the storage device;
   determining file size statistics of the already stored data of said data type;
   determining the remaining free storage capacity on the storage device;
   receiving a request to store data of said data type, the request not indicating a file size;
   according to the determined file size statistics, determining an expected size of data of said data type; and
   if the remaining free storage capacity of the storage device is higher than the expected size of data of said data type, accepting storage of the data.

4. The method according to claim 1, wherein the dominance value of a node relating to a data type is calculated according to:

$$E_{dominant,type} = RPSC * A_{total} * k_1$$

with $$A_{total} = N_{total} * S_{total}$$

$$RPSC = k_2 - k_3(k_4 + S_{average} + C_{used})/C_{total}$$

wherein $k_1, k_2, k_3, k_4$ are constants, $N_{total}$ is the total number of data files of said data type, $S_{total}$ is the accumulated size of files of the data type, $S_{average}$ is the average size of files of the data type, $C_{used}$ is occupied storage capacity of the node and $C_{total}$ is the total storage capacity of the node.

5. The method according to claim 1, wherein the classifying and/or determining of a data class is done according to metadata associated to the data.

6. The method according to claim 1, wherein the nodes are peers in a peer-to-peer network.

7. An apparatus for automatic classification of a node in a network, the apparatus comprising
   means for determining at least one data class;
   means for automatically classifying data stored on said node according to said at least one data class;
   means for determining the amount of the data classified according to said at least one data class, wherein the determining the amount of the data classified according to said at least one data class comprises determining the number of files stored on said node which are classified according to said at least one data class and the average size of said files is determined;
   means for calculating, from the determined amount of the data classified into said at least one data class and a relative potential storage capacity, a dominance value for each of said at least one data class, said dominance value being a measure for the relative dominance of the data stored on the node classified according to one of said at least one data class to all other of said at least one data class;
   means for receiving a request that indicates a data type corresponding to one of said at least one data class; and
   means for providing, in response to the request, said dominance value for said one of said at least one data class corresponding to said data type.

* * * * *